DEVICE FOR ASYMMETRIC CONDUCT OF CURRENT
Filed Aug. 31, 1961
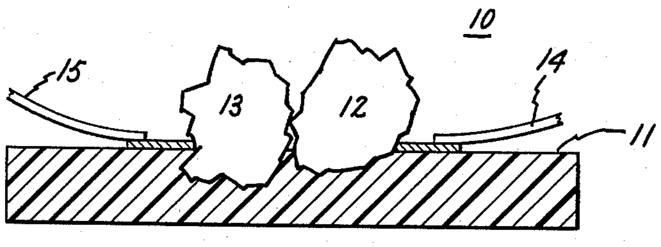
Inventor:
Robert H. Wentorf Jr.,
by James J. Lichiello
His Attorney.

United States Patent Office 3,188,537

Patented June 8, 1965

3,188,537

DEVICE FOR ASYMMETRIC CONDUCT OF CURRENT

Robert H. Wentorf, Jr., Schenectady, N.Y., assignor to General Electric Company, a corporation of New York Filed Aug. 31, 1961, Ser. No. 139,029

10 Claims. (Cl. 317—235)

This invention relates to an electrical junction with semiconducting diamond and more particularly to an asymmetrical or rectifier device utilizing p-type semiconductive crystals chosen from the group consisting of diamond and cubic form of boron nitride crystals.

Semiconductors are electronic conductors and electrical current in them may be carried by two types of charged particles. First, is the electron, a negatively charged particle of charge $4.80 \times 10^{-10}$ E.S.U., and a mass of $9.11 \times 10^{-10}$ 28 g. Semiconductors in which electrons do the charge-carrying are called n-type or excess semiconductors. Semiconductors that conduct through positive hole conduction are p-type or defect semiconductors. This latter particle, whose existence depends upon the quantum mechanical effects in crystals, is similar to an electron in most respects, except that it has a positive charge. It usually also has a somewhat different effective mass than the electron although of the same order of magnitude. A p-type semiconductor and an n-type semiconductor may be suitably electrically connected in the form of a p-n junction, which is a boundary between two regions, one n-type and the other p-type. These semiconductor junctions may act as the essential part of a rectifier, a photoconductivity cell, or a photovoltaic cell, etc.

Among the most important semiconductive phenomena and also one of the first to be ordinarily applied and practiced, is that of contact rectification. Contact rectifiers are usually of two types, the first having, relative to the size of the conducting bodies, a small electrical contact area, and the second, a relatively large electrical contact area. The first is defined as a point contact rectifier, in which two semiconductors p-n are joined together with a point contact and, in the second, they are joined in order to have a surface or area contact known as a bulk junction. As one distinction, current density changes markedly through a point contact in contrast to generally little change through a bulk junction.

Because of the well known characteristics of semiconductors generally, they are very highly desirable elements for various electrical purposes. However, their use is limited, in one sense, by high temperatures which deleteriously affect their electrical properties, and they are also quite dependent up the characteristics of the junction. A particularly desirable semiconductor junction device is one which is extremely durable and resistant to high temperature effects, and such a junction utilizing a diamond crystal and/or a cubic form of boron nitride crystal would have these desirable characteristics, because of the durability and high temperature stability of these crystals.

Accordingly, it is an object of this invention to provide a point contact p-p junction comprising crystals of the class of diamond and the cubic form of boron nitride.

It is another object of this invention to provide a point contact diamond p-p type semiconductor junction device.

It is another object of this invention to provide a point contact p-p type cubic form of boron nitride semi-conductor junction device.

It is another object of this invention to provide an asymmetrical device incorporating a p-type semiconductive diamond and a p-type semiconductive cubic form of boron nitride crystal with point contact.

Briefly described, this invention includes a pair of p-type crystals taken from the class consisting of electrically conductive diamond crystals and electrically conductive cubic form of boron nitride crystals which are placed in juxtaposed or joined relationship whereby the value of an electrical current passing through said crystals in one direction differs from the value of electrical current passing through the crystals in a reverse direction.

This invention will be better understood when taken in connection with the following description and the drawing in which:

FIG. 1 is an exemplary rectifier device in utilizing the p-type crystals of this invention in point contact relationship.

It has been discovered that semiconductive crystals of the cubic form of boron nitride of the p-type and semiconductive crystals of diamond of the p-type may be utilized to produce a rectifying effect. Each of the abovementioned crystals is usually considered to be high pressure, high temperature product which require a high pressure, high temperature apparatus to produce them. It is of course understood that other means may be utilized to grow these crystals, the more common form being a high pressure, high temperature system. Various apparatuses are found in the prior art which are capable of providing the conditions of the processes involved. As an example, one preferred high temperature, high pressure apparatus is that disclosed in U.S. Patent 2,941,248, Hall. Briefly, such an apparatus includes an annular belt member having a convergent divergent aperture therethrough, and a pair of frusto-conical oppositely positioned and movable punches which move into said opening to define a reaction chamber. In the reaction chamber, a reaction vessel containing a specimen material is placed to be subjected to high pressures by motion of the punches, and to high temperatures by means of resistance heating of the material. Such a high pressure, high temperature apparatus is presently utilized in the commercial production of diamond crystal.

Diamond crystals are grown by high temperature, high pressure processes. A preferred method of producing, growing or making diamonds is adequately disclosed and claimed in U.S. Patents 2,947,610, Hall et al. and 2,947,609, Strong et al. Briefly described, the method of making diamonds includes the subjection of a non-diamond form of carbon, for example graphite, together with a catalyst, to sufficiently high pressures and temperatures in the diamond forming region of the phase diagram of carbon, to provide diamond growth. The catalyst is described as containing a metal, for example one of the metals of Group VIII of the Periodic Table of Elements, chromium, manganese, and tantalum.

Diamonds may also be grown as semiconductors utilizing the above-described apparatus and method of making diamonds. Such a method of making semiconductive diamond is dislocated and claimed in copending application Serial No. 130,439, Wentorf et al., filed August 9, 1961, now U.S. Patent 3,148,161, and assigned to the same assignee as this invention. Briefly described, the method of making semiconductive diamond includes the method of making diamonds as previously described, but includes the use of an activator element in addition to the graphite-catalyst combination. The activator element may be, for example boron, aluminum, beryllium, etc. The subjection of the activator-catalyst-non-diamond form of carbon combination to pressures and temperatures in the diamond stable region of the phase diagram of carbon, results in semiconductive diamond crystals of the p-type. The aforementioned docket is therefor incorporated by reference herein.

Semiconductive diamond may also be made by diffusion utilizing a high pressure, high temperature process. A diffusion process is disclosed and claimed in copending applications Serial No. 135,272, Wentorf, now U.S. Patent 3,141,855, and Serial No. 135,273, Cannon, now U.S.

Patent 3,134,739, filed concurrently herewith, and assigned to the same assignee as this invention. The diffusion process of providing a semiconductive diamond crystal includes the subjection of a diamond crystal in combination with an activator material, for example boron, aluminum, etc., to high pressures and high temperatures in order that atoms of the activator material diffuse into the diamond crystal to provide a p-type semiconducting diamond. The aforementioned dockets are incorporated by reference herein.

The cubic form of boron nitride may also be produced by a high pressure, high temperature process using the high pressure apparatus above described. The method of making cubic form of boron nitride is adequately disclosed and claimed in U.S. Patent 2,947,617, Wentorf. Briefly described, the method of making a cubic form of boron nitride comprises, for example subjecting, to a temperature of about 1600° C. and a pressure of about 50,000 atmospheres, a mixture of ingredients comprising at least one catalyst metal selected from the class consisting of the alkali metals, alkali earth metals, lead, antimony, tin, and nitrides of the foregoing metals, and a source of boron selected from the class consisting of elemental boron, hexagonal boron nitride, and compounds of boron decomposable to elemental boron at the elevated temperatures and pressures, and a source of nitrogen selected from the glass consisting of hexagonal boron nitride and nitrogen containing compounds of the aforesaid catalyst materials which provide a source of nitrogen under temperatures and pressures used for effecting formation of the cubic crystal structure boron nitride.

A method of making semiconductive crystals of the cubic form of boron nitride is adequately disclosed and claimed in copending application Serial No. 2,978, Wentorf, filed January 18, 1960, now U.S. Patent 3,078,232, assigned to the same assignee as the present invention. The process for providing the semiconductive cubic form of boron nitride crystal generally includes the method of making or growing a crystal of the cubic form of boron nitride. The process also includes the use of an activator material, such as for example beryllium, in the reactants, which during the high temperature, high pressure process provides atoms of beryllium in a cubic form of boron nitride crystal to provide a semiconductive crystal of the p-type. The aforementioned application is incorporated by reference herein.

It has been discovered that p-p junction between crystals taken from the class consisting of semiconductive diamond crystals and semiconductive crystals of the cubic form of boron nitride exhibit rectification effects when electrical current is passed therethrough in series. This rectification of electrical current is best described as follows. A pair of p-type crystals are electrically connected or joined in series relationship. Electrical connections are made to each crystal, one as positive and the other as negative, so that current may pass through the crystals in series relationship. The arrangement permits the passage of current therethrough more in one direction than in the opposite. It has also been discovered that this effect is attained between p-type cubic form of boron nitride crystals, p-type diamond and p-type cubic form of boron nitride and between p-type diamonds. Best results are obtained when the two crystals which comprise the pair are not both of the same kind of host crystal which has been made semiconducting by means of the same activator material. Specific examples of the practice of this invention are as follows with 4–6 volts used for measuring:

*Example 1*

A diamond crystal of about 1 mm. in size was grown in the previously described growth process with boron as the activator. The diamond crystal exhibited a resistivity of between about $10^2$ to $10^5$ ohm-centimeters at 25° C. A cubic form of boron nitride crystal was grown by the previously described growth process together with beryllium as the activator and displayed a resistivity of about $10^2$ to $10^5$ ohm-centimeters at 25° C. The cubic form of boron nitride crystal was about 1 mm. in size. The two crystals were then placed in juxtaposed position and contacting each other through one, two, or three of locally protruding portions of the crystals. A pair of heavy silver electrodes were placed adjacent the diamond crystal and the cubic form of boron nitride crystal, respectively. It was found that when current was passed through the crystal pair in series at 25° C. with the diamond crystal as the negative terminal, current was about 2 to 20 times the value of the current when the diamond crystal was positive. Thus, these crystal pairs display electrical rectification. More particularly, in this example, the value of current passed through was in the range of 1 to 50 micro-amperes.

*Example 2*

In this example a diamond crystal was employed about 1 mm. in size and had been grown in the aforementioned growth process described in U.S. Patent 3,148,161 using aluminum. It exhibited a resistivity of about $10^5$ ohm-centimeters at 25° C. and was p-type. A cubic form of boron nitride crystal was grown by the aforementioned growth process described in U.S. Patent 3,078,232 employing beryllium. This crystal was p-type and displayed a resistivity of about $10^3$ ohm-centimeters at 25° C., and was about 1 mm. in size. The two crystals were placed in juxtaposed point contact position as in Example 1, and current was passed through the crystal pair in series via heavy silver electrodes. It was found that when the diamond crystal was the positive terminal of the pair, the value of the current was from 2 to 100 times larger than when the diamond crystal was the negative terminal, at 25° C. Thus, these crystal pairs display electrical rectification but in the opposite sense from the pairs described in Example 1. Typical currents employed were in the range of 1 to 20 micro-amperes.

*Example 3*

In this example the diamond crystal was about 0.3 mm. in size and had been grown as described in U.S. Patent 3,078,232 using beryllium sulfide. The crystal was p-type and had a resistivity of about $3\times10^3$ ohm-centimeters at 25° C. It was placed in point contact with a p-type crystal of cubic boron nitride similar to that described in Example 1.

The crystal pair was held between heavy silver electrodes as in Example 1 and currents were passed through the pair in series at 25° C. It was found that the value of the current which passed when the diamond crystal was the positive electrode of the pair was from 4 to 100 times greater than when the diamond crystal was negative. Typical currents were in the range of 1 to 10 micro-amperes.

*Example 4*

In this example the diamond crystal was about 0.3 mm. in size and had been made semiconducting by the boron diffusion process described in U.S. Patent 3,141,855, Wentorf, filed concurrently herewith. The diamond exhibited a resistivity of about $10^4$ ohm-centimeters at 25° C. and was a p-type semiconductor. The cubic boron nitride crystal was grown by the process described in U.S. Patent 3,078,232 using beryllium. The crystal was about 1 mm. in size, was p-type, and had a resistivity of about $10^3$ ohm-centimeters at 25° C. The two crystals were placed between silver electrodes oriented in point contact as in Example 1. It was found that when an electric current was passed through the pair in series, the value of the current was from 2 to 20 times larger when the diamond crystal was the negative electrode of the pair than when the diamond was the positive electrode.

*Example 5*

In this example two p-type diamond crystals exhibited electrical rectification effects. One crystal was about 1 mm. in size and had been grown in the process described in U.S. Patent 3,148,161 employing aluminum as the activator and an iron catalyst. The other crystal was about 1 mm. in size and had been grown by the same process using boron as the activator. Each crystal had a resistivity in the range of $10^2$ to $10^5$ ohm-centimeters. When placed between silver electrodes as in Example 1, it was found that at 25° C., the value of the current passing in series through the crystal pair was from 2 to 20 times larger when the boron-doped crystal was negative than the value of the current which passed when the boron-doped crystal was positive. Typical currents ranged from 1 to 20 micro-amperes. In this example, an electrical rectifier or asymmetrical device is obtained using semiconductive diamond crystals, each of p-type, but prepared by different doping processes using different activator materials.

Further examination of various pairs of diamonds and borazon crystals indicated that electrical rectification was evidenced in all pairs. It is of interest to note that each crystal, both the diamond and the cubic form of boron nitride, was a p-type crystal. The rectification behavior was not essentially altered by heating the crystal pairs to temperatures the order of 200° C., although naturally the average electrical resistance for either current direction was lower at higher temperatures.

The p-type crystals may be employed as an electrical junction rectifier device in various ways. One particular arrangement is illustrated in FIG. 1. In FIG. 1, a simple assembly 10 includes the use of general support means 11, which is electrically nonconductive, to support the p-type crystals 12 and 13 in point contact relationship for current rectification. The crystals themselves may be employed as the current connection terminals or suitable terminal members 14 and 15 may be suitably connected thereto.

There is thus provided, by the teachings of this invention, an electrical junction device utilizing a pair of p-type semiconductive crystals from the class of diamond and cubic form of boron nitride crystals. The electrical junction device also acts as an asymmetrical device by passing more electrical current therethrough in one direction than in an opposite direction.

While a specific method and apparatus in accordance with this invention has been shown and described, it is not desired that the invention be limited to the particular description nor to the particular configurations described, and it is intended by the appended claims to cover all modifications within the spirit and scope of this invention.

What I claim as new and desire to secure by Letters Patent of the United States is:

1. A point contact p-p type rectification junction comprising p-type semiconducting crystals taken from the class consisting of diamond crystals and cubic form of boron nitride crystals, said crystals being electrically connected in crystal-to-crystal point contact relationship.

2. A point contact p-p type rectification junction comprising a pair of p-type semiconducting diamond crystals, said diamond crystals being electrically connected in crystal-to-crystal point contact.

3. A point contact p-p type rectification junction comprising a pair of p-type semiconducting cubic form of boron nitride crystals, said crystals being electrically connected in crystal-to-crystal point contact relationship.

4. A point contact p-p type rectification junction comprising a p-type semiconducting diamond crystal and a p-type semiconducting cubic form of boron nitride crystal, said crystals being electrically connected in crystal-to-crystal point contact relationship.

5. A point contact p-p type rectification junction comprising a pair of p-type semiconducting crystals taken from the class consisting of diamond crystals and cubic form of boron nitride crystals, said crystals being electrically connected in crystal-to-crystal point contact relationship, and said crystals being characterized by containing different activator materials.

6. The p-p type rectification junction as recited in claim 5 wherein one of the crystals is diamond.

7. The p-p type rectification junction as recited in claim 5 wherein one of the crystals is of the cubic form of boron nitride.

8. The p-p type rectification junction as recited in claim 5 wherein one of the p-type semiconducting crystals is diamond made semiconductive by the addition of boron therein.

9. A point contact p-p type electrical rectifier comprising in combination, electrical nonconductive support means, a rectification junction comprising a pair of p-type semiconducting crystals affixed to said support, said crystals being taken from the class consisting of diamond crystals and cubic form of boron nitride crystals, said crystals being electrically connected in crystal-to-crystal point contact series relationship, and terminal means electrically connected to said crystals to apply current to said crystals.

10. The rectifier as recited in claim 9 wherein the pair of crystals consists of a p-type diamond and a p-type cubic form of boron nitride.

References Cited by the Examiner

UNITED STATES PATENTS

| | | | |
|---|---|---|---|
| 2,932,594 | 4/60 | Mueller | 148—33.6 X |
| 2,980,833 | 4/61 | Epstein | 317—236 |
| 2,988,676 | 6/61 | North | 317—236 |
| 3,078,232 | 2/63 | Wentorf | 252—62.3 |
| 3,141,802 | 7/64 | Wentorf | 148—171 |
| 3,141,855 | 7/64 | Wentorf | 252—623 |

OTHER REFERENCES

Shive: "Semiconductor Devices," Chapter 10.

Shive: "Semiconductor Devices," D. Van Nostrand Company, Inc., Princeton, New Jersey, 1959, pages 92 and 93.

HYLAND BIZOT, *Primary Examiner.*

RAY K. WINDHAM, DAVID L. RECK, *Examiners.*